US008806349B2

(12) United States Patent
Hakoda

(10) Patent No.: US 8,806,349 B2
(45) Date of Patent: Aug. 12, 2014

(54) SERVER APPARATUS, METHOD, PROGRAM AND INTEGRATED CIRCUIT, FOR CONTROLLING USER INTERFACE DISPLAY

(75) Inventor: Kotaro Hakoda, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 290 days.

(21) Appl. No.: 13/321,413

(22) PCT Filed: Feb. 15, 2011

(86) PCT No.: PCT/JP2011/000817
§ 371 (c)(1),
(2), (4) Date: Nov. 18, 2011

(87) PCT Pub. No.: WO2011/118122
PCT Pub. Date: Sep. 29, 2011

(65) Prior Publication Data
US 2012/0072849 A1 Mar. 22, 2012

(30) Foreign Application Priority Data

Mar. 23, 2010 (JP) ................................. 2010-066857

(51) Int. Cl.
*G06F 3/00* (2006.01)
*G06F 13/00* (2006.01)

(52) U.S. Cl.
CPC ...................................... *G06F 13/00* (2013.01)
USPC ........... 715/744; 715/746; 715/717; 715/718; 715/740

(58) Field of Classification Search
USPC ........................... 715/744, 746, 717, 718, 740
See application file for complete search history.

(56) References Cited

U.S. PATENT DOCUMENTS

| 8,214,459 B2* | 7/2012 | Matsubara et al. ........... 709/218 |
| 2003/0009760 A1* | 1/2003 | Sakamoto et al. .............. 725/74 |
| 2004/0267965 A1* | 12/2004 | Vasudevan et al. ........... 709/250 |
| 2006/0262221 A1 | 11/2006 | Yuasa et al. |

(Continued)

FOREIGN PATENT DOCUMENTS

| JP | 2002-510415 | 4/2002 |
| JP | 2005-109746 | 4/2005 |

(Continued)

OTHER PUBLICATIONS

International Search Report issued Mar. 22, 2011 in corresponding International Application No. PCT/JP2011/000817.

*Primary Examiner* — Weilun Lo
*Assistant Examiner* — Rashedul Hassan
(74) *Attorney, Agent, or Firm* — Wenderoth, Lind & Ponack, L.L.P.

(57) ABSTRACT

A server apparatus of the present invention extracts the second client apparatus cooperable with the first client apparatus and transmits an instruction to the second client apparatus to launch a user interface, based on a user interface request from the first client apparatus, and transmits an instruction to the second client apparatus to display the user interface, based on a cooperation request from the first client apparatus, and thereby the first client apparatus and the second client apparatus cooperate with each other to allow an operation of the server apparatus in a short time after a cooperation request for causing the first client apparatus operated by a user and the second client apparatus different from the first client apparatus to cooperate with each other.

13 Claims, 14 Drawing Sheets

(56) References Cited

U.S. PATENT DOCUMENTS

| | | | |
|---|---|---|---|
| 2007/0047902 A1* | 3/2007 | Ito et al. | 386/46 |
| 2007/0136778 A1* | 6/2007 | Birger et al. | 725/117 |
| 2009/0081950 A1* | 3/2009 | Matsubara et al. | 455/3.06 |
| 2009/0150553 A1* | 6/2009 | Collart et al. | 709/229 |
| 2010/0161822 A1* | 6/2010 | Palm et al. | 709/231 |
| 2010/0201876 A1* | 8/2010 | Lin et al. | 348/554 |
| 2011/0007901 A1* | 1/2011 | Ikeda et al. | 380/270 |
| 2011/0116540 A1* | 5/2011 | O'Connor et al. | 375/240.02 |
| 2011/0131520 A1* | 6/2011 | Al-Shaykh et al. | 715/772 |
| 2011/0167168 A1* | 7/2011 | Kim | 709/231 |
| 2011/0167447 A1* | 7/2011 | Wong | 725/40 |
| 2011/0285658 A1* | 11/2011 | Homma et al. | 345/173 |
| 2011/0302300 A1* | 12/2011 | Kikkawa et al. | 709/224 |
| 2012/0212680 A1* | 8/2012 | Kohanek | 348/734 |
| 2012/0221662 A1* | 8/2012 | Yasukawa et al. | 709/206 |

FOREIGN PATENT DOCUMENTS

| | | |
|---|---|---|
| JP | 2007-4773 | 1/2007 |
| JP | 2010-33477 | 2/2010 |
| WO | 98/59282 | 12/1998 |

\* cited by examiner

F I G. 4

APPARATUS INFORMATION 400 OF FIRST CLIENT APPARATUS 210

```
<xml>
<profile>
<name>Justice</name>
<address>132.182.13.55</address>
<resolution>320, 240</resolution>
<image>jpg, png</image>
<cooperation>Navi, Record</cooperation>
<execution>Navi</execution>
<operation>first</operation>
</profile>
```

FIG. 5

APPARATUS INFORMATION 500 OF SECOND CLIENT APPARATUS 220

```
<xml>
<profile>
<name>Freedom</name>
<address>132.182.13.44</address>
<resolution>1920,1080</resolution>
<image>jpg, png</image>
<cooperation>Navi, Record</cooperation>
<operation>second</operation>
</profile>
```

FIG. 6

COOPERATION HISTORY 600

| No. | FIRST CLIENT APPARATUS | SECOND CLIENT APPARATUS | COOPERATION POSSIBILITY | CONTENT OF COOPERATION | COOPERATION COUNT | DISPLAY RESOLUTION | LAST COOPERATION TIME |
|---|---|---|---|---|---|---|---|
| 1 | Justice | Freedom | ○ | Navi | 5 | 1920 × 1080 | 2009/3/31 13:30 |
| 2 | Justice | Strike | ○ | Navi | 3 | 640 × 480 | 2009/5/29 15:21 |
| 3 | Justice | Strike | ○ | Record | 3 | 640 × 480 | 2009/4/25 10:10 |
| 4 | Peace | Freedom | ○ | Navi | 3 | 1920 × 1080 | 2009/3/31 18:35 |
| 5 | Justice | Wing | × | — | — | — | — |

FIG. 7

USER INTERFACE CORRESPONDENCE TABLE 700

| No. | CLIENT APPARATUS | APPLICATION | USER INTERFACE |
|---|---|---|---|
| 1 | Justice | Navi | J_Navi_UI |
| 2 | Justice | Record | J_Record_UI |
| 3 | Wing | Navi | W_Navi_UI |
| 4 | Strike | Navi | S_Navi_UI |
| 5 | Strike | Record | S_Record_UI |
| 6 | Freedom | Navi | F_Navi_UI |
| 7 | Freedom | Record | F_Record_UI |

US 8,806,349 B2

SERVER APPARATUS, METHOD, PROGRAM AND INTEGRATED CIRCUIT, FOR CONTROLLING USER INTERFACE DISPLAY

TECHNICAL FIELD

The present invention relates to a server apparatus for controlling user interface display, and more particularly to a server apparatus for controlling user interface display in a client apparatus different from a client apparatus that performs remote operations.

BACKGROUND ART

In recent years, broadband Internet connections and wireless networks have been widely used. In addition, advance in DLNA (Digital Living Network Alliance) technology, which is compatible technology for connecting devices to one another, allows digital consumer electronic devices other than personal computers to be connected and communicate to one another over a network at home. For example, various new services have been introduced in which digital consumer electronic devices, such as a digital TV and a DVD recorder, or a mobile phone and a DVD recorder, cooperate with each other to allow remote program scheduling and remote program viewing.

Specifically, a client apparatus connects to a server apparatus via a network to acquire, from the server apparatus, a user interface whereby the server apparatus is operated. The client apparatus then remotely operates the acquired user interface to playback, view, or download videos and picture content stored in the server apparatus.

Furthermore, in the case where, for example, a portable device is used to operate a DVD recorder or a Blu-Ray recorder, the portable device acquires, from the DVD recorder or the Blu-Ray recorder, a user interface whereby the DVD recorder or the Blu-Ray recorder is operated. A user then remotely operates the acquired user interface by using the portable device. The portable device, however, has a small region for displaying the user interface. Thus, by transferring the user interface to another client apparatus having a large region for displaying the user interface, and displaying the user interface on a large screen, the user operability is improved.

FIG. 14 is a diagram showing a user interface display control system 90 which controls a user interface display in conventional technology. In FIG. 14, the user interface display control system 90 includes a DVD recorder 901 which is a server apparatus, a mobile phone 902 which is a client apparatus operated by a user, and a digital TV 903 which is another client apparatus for displaying the user interface.

First, the mobile phone 902 transmits a user interface request to the DVD recorder 901 and receives a user interface response from the DVD recorder 901. The mobile phone 902 then displays an operation screen for the DVD recorder 901 on a display screen (display region) of the mobile phone 902. In this manner, the mobile phone 902 acquires the user interface of the DVD recorder 901 so as to be able to remotely operate the DVD recorder 901 using the mobile phone 902.

Furthermore, the mobile phone 902 transmits a cooperation request to the digital TV 903. On the basis of the cooperation request from the mobile phone 902, the digital TV 903 transmits a user interface request to the DVD recorder 901 and receives a user interface response from the DVD recorder 901. The digital TV 903 then displays an operation screen for the DVD recorder 901 on a display screen (display region) of the digital TV 903.

As described above, the mobile phone 902 cooperates with the digital TV 903 to display, on the display screen (display region) of the digital TV 903, the operation screen for the DVD recorder 901 which is displayed on the display screen (display region) of the mobile phone 902. Displaying the operation screen for the DVD recorder 901 on the display screen (display region) of the digital TV 903 that is larger than the display screen (display region) of the mobile phone 902 enhances user viewability. As a result, user operability with respect to the DVD recorder 901, such as remote program scheduling and remote program viewing, improves.

Also, such system which improves user operability is disclosed in Patent Literature 1. In Patent Literature 1, icons for cooperable remote devices are displayed and a user is allowed to select an icon for a remote device to cooperate with, among the displayed icons. Thereafter, the remote device being requested for cooperation acquires a user interface and a plurality of remote devices are caused to cooperate with each another, thereby improving the user operability.

CITATION LIST

Patent Literature

PATENT LITERATURE 1: Japanese National Phase PCT Laid-Open Publication No. 2002-510415

SUMMARY OF THE INVENTION

Problems to be Solved by the Invention

As shown in FIG. 14, however, there is a problem in that the user interface display control system 90 is extremely time consuming from transmission of the user interface request from the mobile phone 902 to the DVD recorder 901, display of the operation screen for the DVD recorder 901 on the display screen of the digital TV 903, cooperation between the mobile phone 902 and the digital TV 903, to the time when operation of the DVD recorder 901 becomes available.

Therefore, an object of the present invention to provide a server apparatus which causes the first client apparatus and the second client apparatus to cooperate with each other to allow an operation of the server apparatus in a short time after the cooperation request for causing the first client apparatus operated by the user and the second client apparatus different from the first client apparatus to cooperate with each other.

Solution to the Problems

In order to solve the above object, the server apparatus of the present invention is a server apparatus for controlling user interface display in a first client apparatus and a second client apparatus different from the first client apparatus, which are any of a plurality of client apparatuses communicated with each other via a network, the server apparatus including: a storage section having stored therein a user interface, for each of the plurality of client apparatuses, whereby the server apparatus is operated in the client apparatus; a reception section for receiving, from the first client apparatus, a user interface request which is a request for a first user interface whereby the server apparatus is operated in the first client apparatus, and a cooperation request for causing the first client apparatus and the second client apparatus to cooperate with each other for an operation of server apparatus; a cooperable apparatus determination section for selecting a second client apparatus cooperable with the first client apparatus among the plurality of client apparatuses, based on the user interface request received by the reception section; a user interface transmission control section for acquiring a second user interface whereby the server apparatus is operated in the second client apparatus selected by the cooperable apparatus determination section, among the user interfaces stored in the storage section; and a transmission section for transmitting, to the second client apparatus, the second user interface acquired by the user interface transmission control section and a launch instruction to launch the second user interface, wherein when the reception section has received the cooperation request from the first client apparatus, the transmission section transmits a display instruction to the second client apparatus to display the second user interface transmitted to the second client apparatus, based on the cooperation request received by the reception section.

Furthermore, preferably, in a case where there is a plurality of second client apparatuses cooperable with the first client apparatus, the cooperable apparatus determination section sets priorities in selecting a cooperation target for the plurality of second client apparatuses.

Furthermore, preferably, the storage section has stored therein cooperation history, regarding the plurality of client apparatuses, which indicates whether each of the plurality of client apparatuses has ever cooperated with the first client apparatus, and the cooperable apparatus determination section refers to the cooperation history stored in the storage section to set the priorities.

Furthermore, preferably, the cooperation history includes cooperation count information which is information regarding the number of incidents of cooperation between the first client apparatus and each of the plurality of client apparatuses, and the cooperable apparatus determination section sets the priorities, based on the cooperation count information.

Also, preferably, the cooperation history includes cooperation time information which is information regarding time when the first client apparatus and each of the plurality of client apparatuses cooperate with each other, and the cooperable apparatus determination section sets the priorities, based on the cooperation time information.

Furthermore, preferably, in a case where there is a plurality of second client apparatuses cooperable with the first client apparatus, the transmission section transmits a termination instruction to a second client apparatus, that is not selected as the cooperation target, to terminate the user interface running in the background in the second client apparatus that is not selected as the cooperation target.

Also, preferably, the storage section has stored therein cooperation history, regarding the plurality of client apparatuses, which indicates whether each of the plurality of client apparatuses has ever cooperated with the first client apparatus, and the cooperable apparatus determination section refers to the cooperation history stored in the storage section to select a client apparatus that has ever cooperated with the first client apparatus, as the second client apparatus.

Furthermore, preferably, the cooperation history includes cooperation count information which is information regarding the number of incidents of cooperation between the first client apparatus and each of the plurality of client apparatuses, and the cooperable apparatus determination section determines confidence in cooperation as the second client apparatus, based on the cooperation count information.

Furthermore, preferably, the cooperation history includes cooperation time information which is information regarding time when the first client apparatus and each of the plurality of client apparatuses cooperate with each other, and the cooperable apparatus determination section determines confidence in cooperation as the second client apparatus, based on the cooperation time information.

Also, preferably, the cooperable apparatus determination section selects a client apparatus having a display screen (display region) larger than a display screen (display region) of the first client apparatus, as the second client apparatus.

Also, preferably, the storage section has stored therein a user interface correspondence table in which apparatus information regarding each of the plurality of client apparatuses and the user interface stored in the storage section are associated with each other, and the user interface transmission control section refers to the user interface correspondence table stored in the storage section to acquire the first user interface and the second user interface.

Also, in order to achieve the above object, a process performed by each component of the server apparatus of the present invention described above can be understood as a user interface display control method which provides a series of process steps. The method is provided in a form of a program which causes a computer to execute the series of process steps. The program may be stored in a computer readable storage medium and introduced to the computer.

Advantageous Effects of the Invention

As described above, according to the server apparatus of the present invention, the first client apparatus operated by the user and the second client apparatus different from the first client apparatus cooperate with each other to allow an operation of the server apparatus in a short time after the cooperation request for causing the first client apparatus and the second client apparatus to cooperate with each other.

BRIEF DESCRIPTION OF THE DRAWINGS

FIG. 4 is a diagram showing apparatus information 400 regarding a first client apparatus 210.

FIG. 5 is a diagram showing apparatus information 500 regarding a second client apparatus 220.

FIG. 6 is a diagram showing cooperation history 600 representing contents of cooperation between the first client apparatus and the second client apparatus.

FIG. 7 is a diagram showing a user interface correspondence table 700.

DESCRIPTION OF EMBODIMENTS

Hereinafter, an embodiment of the present invention will be described with reference to accompanying drawings.

<Outline>

First, an outline of a system in an embodiment of the present invention will be described.

Figure 1:
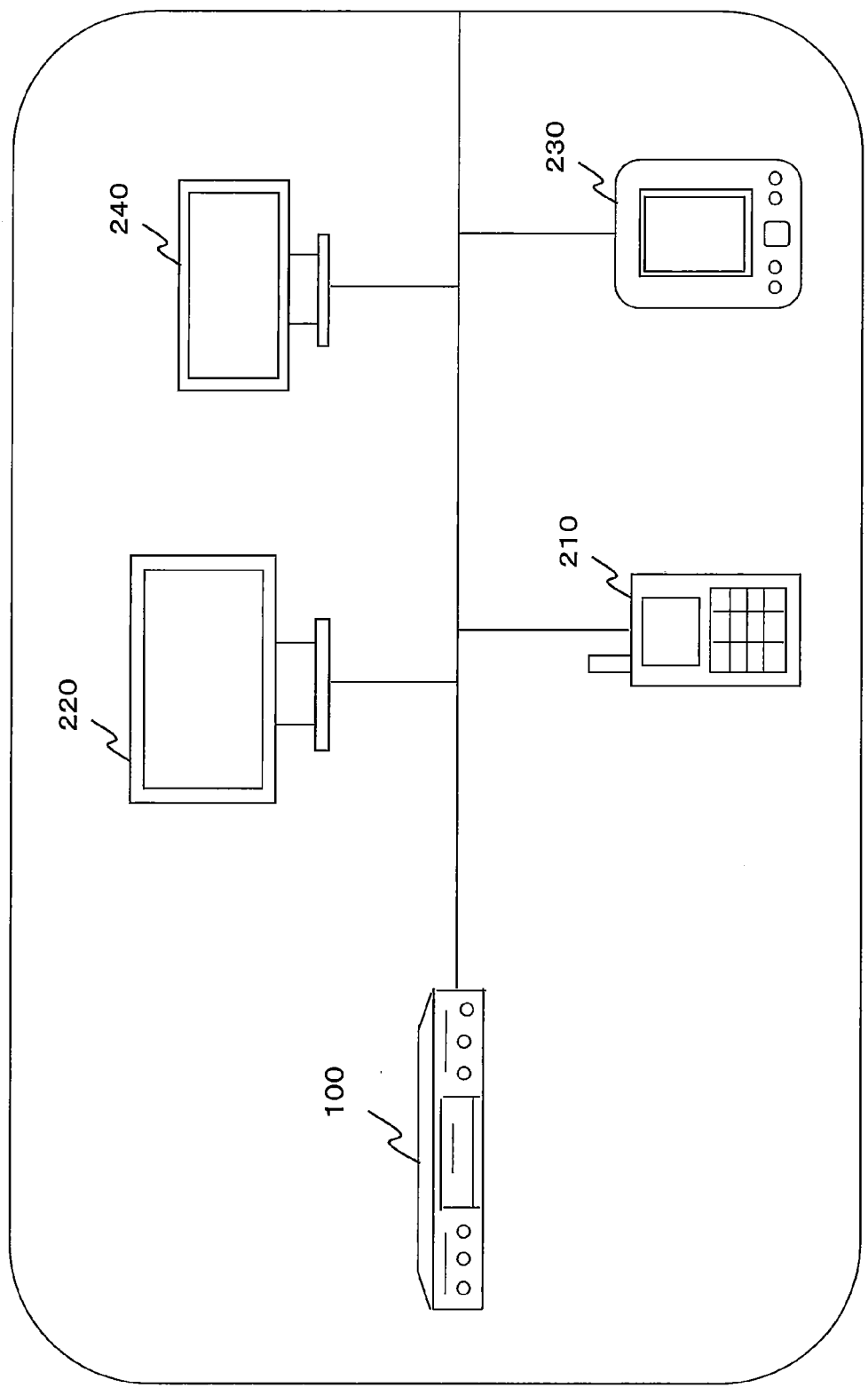
FIG. 1 is a diagram showing a home network system 10 in an embodiment of the present invention.

FIG. 1 is a diagram showing a home network system 10 in the embodiment of the present invention. In FIG. 1, the home network system 10 includes a server apparatus 100, first client apparatuses 210 and 230, and second client apparatuses 220 and 240.

It should be noted that the first client apparatuses are remote devices operated by a user to remotely operate the server apparatus. The second client apparatuses are devices which remotely operate the server apparatus in cooperation with the first client apparatus. Typically, the user operates the first client apparatus while seeing an operation screen, for the server apparatus, which is displayed on a display screen (display region) of the second client apparatus, thereby remotely operating the server apparatus.

Here, it is assumed that the server apparatus 100 is a DVD recorder, the first client apparatuses 210 and 230 are mobile phones, and the second client apparatuses 220 and 240 are digital TVs. It should be noted that the server apparatus, the first client apparatuses, and the second client apparatuses included in the home network system 10 are not limited thereto, and may be, for example, a Blu-Ray recorder, a digital camera, and the like, and other remote devices may be connected thereto.

Furthermore, devices included in the home network system 10 are connected to one another via a wire network and a wireless network including BLUETOOTH and the like, to realize communication between the devices. The communication between the devices is also not limited to communication via an internal network at home. For example, the DVD recorder which is the server apparatus 100 may exist in the home, and the mobile phone which is the first client apparatus 210 and the digital TV which is the second client apparatus 220 may exist outside the home, and the communication between the devices may be realized by the Internet or the like.

Figure 2:
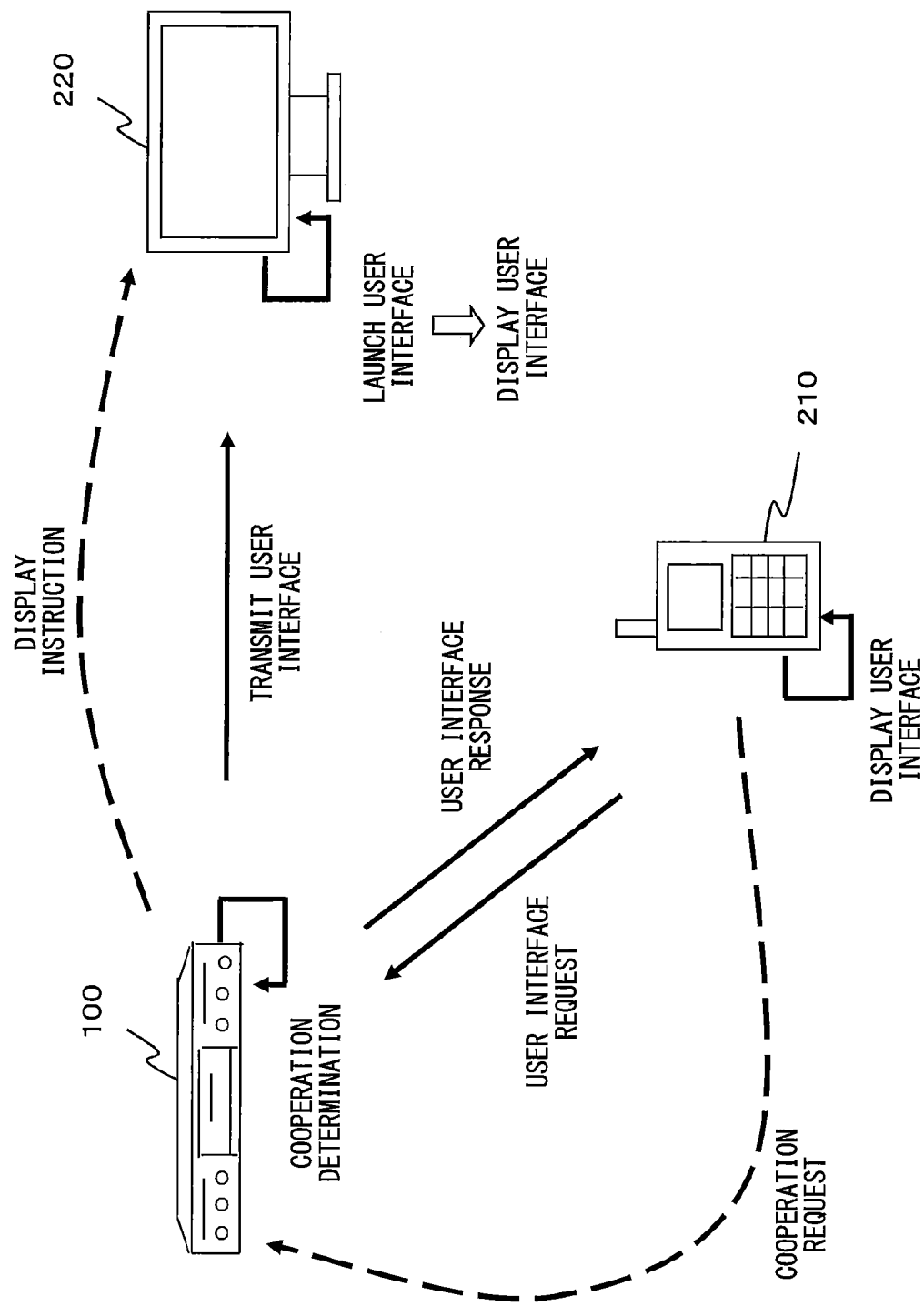
FIG. 2 is a diagram showing a user interface display control system 20 which controls a user interface display in the embodiment of the present invention.

FIG. 2 is a diagram showing a user interface display control system 20 which controls a user interface display in the embodiment of the present invention. In FIG. 2, the user interface display control system 20 includes the server apparatus (the DVD recorder) 100, the first client apparatus (the mobile phone) 210, and the second client apparatus (the digital TV) 220. It should be noted that the user interface display control system 20 in FIG. 2 includes the server apparatus 100 (the DVD recorder), the first client apparatus 210 (the mobile phone), and the second client apparatus 220 (the digital TV) of the home network system 10 shown in FIG. 1.

The mobile phone 210 transmits a user interface request to the DVD recorder 100, and receives a user interface response from the DVD recorder 100. The mobile phone 210 then displays, on a display screen (display region) thereof, an operation screen for the DVD recorder 100.

The DVD recorder 100 determines a second client apparatus which is cooperable with the mobile phone 210, based on the user interface request from the mobile phone 210. Here, it is assumed that the digital TV 220 is determined to be the second client apparatus cooperable with the mobile phone 210. The DVD recorder 100 then transmits a user interface to the digital TV 220. It should be noted that details of a method for determining the second client apparatus cooperable with the mobile phone 210 will be described below.

The digital TV 220 receives the user interface from the DVD recorder 100, and prepares so that the operation screen for the DVD recorder 100 based on the received user interface can be displayed. Typically, the digital TV 220 does not display, on the display screen (display region) of the digital TV 220, the operation screen for the DVD recorder 100 based on the received user interface, but maintains the operation screen for the DVD recorder 100 running in the background.

Furthermore, the mobile phone 210 transmits to the DVD recorder 100 a cooperation request for displaying the operation screen for the DVD recorder 100 on the display screen (display region) of the digital TV 220 which is the cooperable second client apparatus.

On the basis of the cooperation request from the mobile phone 210, the DVD recorder 100 transmits a display instruction to the digital TV 220 to display the operation screen for the DVD recorder 100 on the display screen (display region) of the digital TV 220.

On the basis of the display instruction from the DVD recorder 100, the digital TV 220 displays the operation screen for the DVD recorder 100, which is prepared, being maintained running in the background, so as to be displayed, on the display screen (display region) of the digital TV 220.

In this manner, the mobile phone 210 and the digital TV 220 are caused to cooperate with each other and the DVD recorder 100 is operated.

<Configuration>

Next, a configuration of the server apparatus in the embodiment of the present invention will be described.

Figure 3:
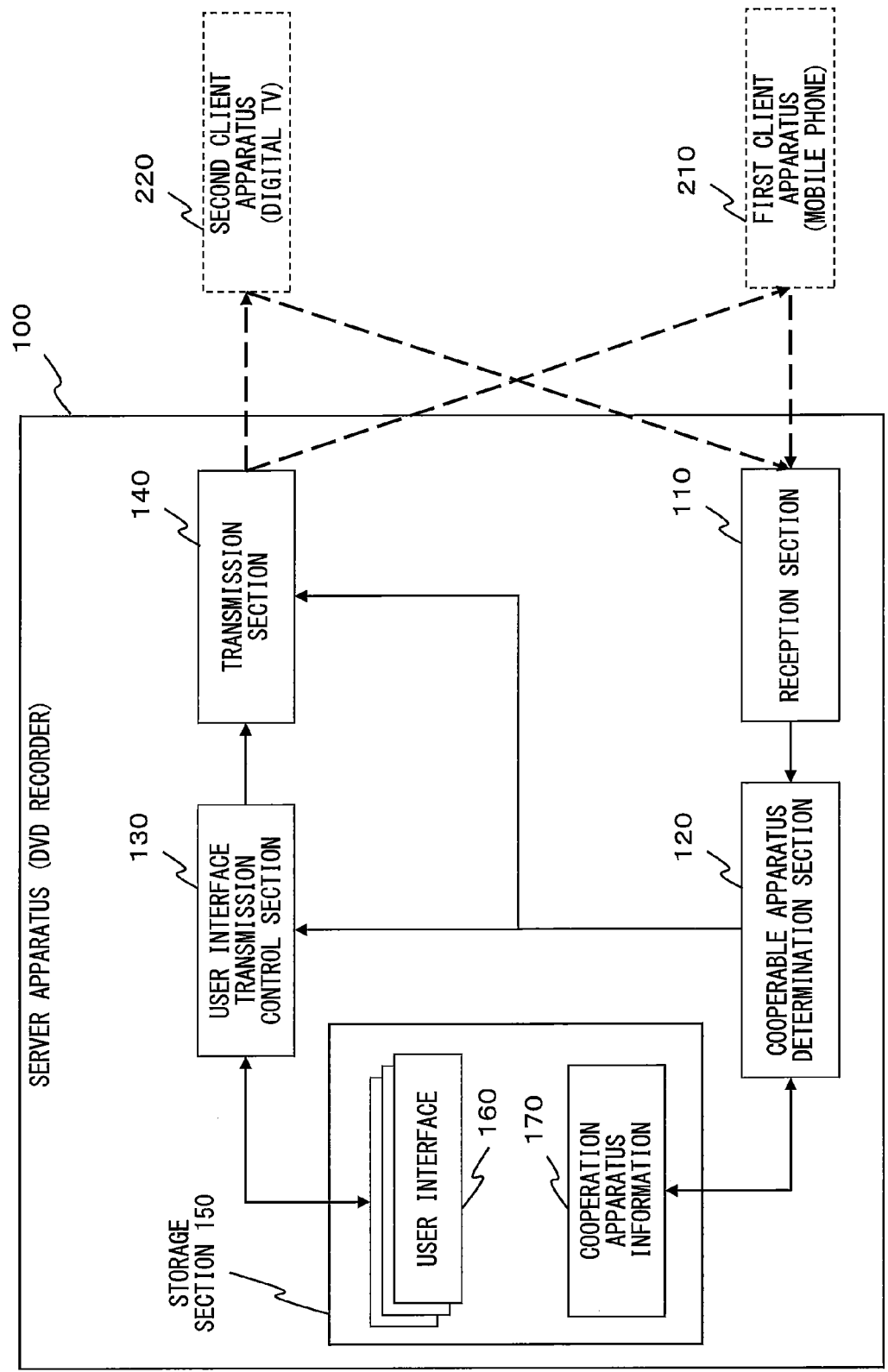
FIG. 3 is a diagram showing a server apparatus 100 in the embodiment of the present invention.

FIG. 3 is a diagram showing the server apparatus 100 in the embodiment of the present invention. In FIG. 3, the server apparatus (the DVD recorder) 100 includes a reception section 110, a cooperable apparatus determination section 120, a user interface transmission control section 130, a transmission section 140, and a storage section 150. Furthermore, a plurality of user interfaces 160, and cooperation apparatus information 170 are stored in the storage section 150. It should be noted that the server apparatus 100 communicates with the first client apparatus (the mobile phone) 210 and the second client apparatus (the digital TV) 220 over the network.

The reception section 110 receives the user interface request from the first client apparatus 210. Here, the user interface request is a request for acquiring, from the server apparatus 100, the user interface whereby the server apparatus 100 is operated by the first client apparatus 210. The user interface request includes apparatus information regarding the first client apparatus 210.

FIG. 4 is a diagram showing apparatus information 400 regarding the first client apparatus 210. In FIG. 4, the apparatus information 400 regarding the first client apparatus 210 is in a form of an XML (Extensible Markup Language) file, and the information (functions) is described in a <profile> tag.

Specifically, a device name of the first client apparatus is described in a <name> tag, and "Justice", which is the device name of the first client apparatus 210, is described here.

An IP (Internet Protocol) address of the first client apparatus is described in an <address> tag, and "132.182.13.55", which is the IP address of the first client apparatus 210, is described here.

A display resolution of the first client apparatus is described in a <resolution> tag, and "320, 240", which is the display resolution of the first client apparatus 210, is described here. It should be noted that "320, 240" indicates that the display resolution is 320×240.

A format of an image displayable in the first client apparatus is described in an <image> tag, and "png, jpg", which are the formats of the images displayable in the first client apparatus 210, are described here. It should be noted that "png, jpg" indicates that images having PNG (Portable Network Graphics) and JPEG (Joint Photographic Expert Group) formats are displayable.

An application cooperable in the first client apparatus is described in a <cooperation> tag, and "Navi, Record", which are user interfaces (the applications) cooperable in the first client apparatus 210, are described here. It should be noted that "Navi, Record" indicates that user interfaces (the applications) for menu operation and storing are cooperable.

A user interface (application) for which the first client apparatus transmits the user interface request to the server apparatus is described in an <execution> tag, and "Navi", which is the user interface (application) for which the first client apparatus 210 transmits the user interface request to the server apparatus 100, is described here.

Information, "first", which indicates the first client apparatus, is described in an <operation> tag. It should be noted that, with regard to a plurality of client apparatuses connected in the home network system, a client apparatus that has, for example, a relatively small display resolution (display screen, display region) is set to be the first client apparatus.

In addition, it is assumed that the apparatus information 400 regarding the first client apparatus 210 is included in the user interface request transmitted from the first client apparatus 210 to the server apparatus 100, but not limited thereto. The user interface request may include information corresponding to that in the <execution> tag of the apparatus information 400 regarding the first client apparatus 210 shown in FIG. 4. The other information is device-unique information regarding the first client apparatus 210, and may be previously stored in the storage section 150 of the server apparatus 100. Alternatively, if the other information is stored in the server apparatus 100 when transmitted thereto once, the other information may not be transmitted each time the first client apparatus 210 transmits the user interface request.

Furthermore, when the second client apparatus 220 connected to the server apparatus 100 over the network is launched and the second client apparatus 220 has transmitted apparatus information to the server apparatus 100, the reception section 110 receives the apparatus information from the second client apparatus 220.

FIG. 5 is a diagram showing apparatus information 500 regarding the second client apparatus 220. In FIG. 5, the apparatus information 500 regarding the second client apparatus 220 is in a form of the same XML file as the apparatus information 400 regarding the first client apparatus 210 shown in FIG. 4.

Specifically, in the <name> tag, "Freedom", which is a device name of the second client apparatus 220, is described.

In the <address> tag, "132.182.13.44", which is an IP address of the second client apparatus 220, is described.

In the <resolution> tag, "1920, 1080", which is a display resolution of the second client apparatus 220, is described. Here, the display resolution of the second client apparatus 220 is characterized to have a larger display resolution than the first client apparatus 210.

In the <image> tag, "png, jpg", which are formats of images displayable in the second client apparatus 220, are described.

In the <cooperation> tag, "Navi, Record", which are user interfaces (applications) cooperable in the second client apparatus 220, are described.

In the <operation> tag, "second", which is information indicative of the second client apparatus, is described. Since the display resolution of the second client apparatus 220 is larger than the display resolution of the first client apparatus 210 as described above, the second client apparatus 220 is set to be the second client apparatus. In addition, suppose that a client apparatus having a display resolution larger than the display resolution of the second client apparatus 220 exists in the network and if there is a possibility that the second client apparatus 220 becomes the first client apparatus, "first, second" may be described in the <operation> tag.

It should be noted that, in the apparatus information 500 regarding the second client apparatus 220, the <execution> tag in the apparatus information 400 regarding the first client apparatus 210 shown in FIG. 4 does not exist. This is because the first client apparatus transmits the user interface request. That is, this is because the second client apparatus is caused to cooperate with the first client apparatus and the second client apparatus does not transmit the user interface request.

Also, it is assumed that the apparatus information 500 regarding the second client apparatus 220 is transmitted from the second client apparatus 220 to the server apparatus 100 when the second client apparatus 220 is launched, but not limited thereto. For example, the apparatus information 500 regarding the second client apparatus 220 may be previously stored in the storage section 150 of the server apparatus 100. Alternatively, if the apparatus information 500 is stored in the server apparatus 100 when transmitted thereto once, the apparatus information 500 may not be transmitted each time the second client apparatus 220 is launched.

It is noted here that it is assumed that the apparatus information 400 regarding the first client apparatus 210 shown in FIG. 4 and the apparatus information 500 regarding the second client apparatus 220 shown in FIG. 5 are in the form of XML file, but not limited thereto. For example, the apparatus information 400 regarding the first client apparatus 210 and the apparatus information 500 regarding the second client apparatus 220 may be in a form of a binary file or text file if a protocol is determined between the server apparatus and the client apparatuses.

Also, the reception section 110 receives the cooperation request from the first client apparatus 210. Here, the cooperation request is a request for displaying the operation screen for the server apparatus 100 on the display screen (display region) of the second client apparatus 220 cooperable with the first client apparatus 210.

On the basis of the user interface request received by the reception section 110, the cooperable apparatus determination section 120 selects a second client apparatus candidate which is the second client apparatus cooperable with the first client apparatus 210 among the plurality of client apparatuses connected to the server apparatus 100 via the network.

While it has been assumed thus far that the second client apparatus 220 is maintained running and is cooperable with the first client apparatus 210, the server apparatus 100 in the end selects the second client apparatus which cooperates with the first client apparatus 210, while extracting the second client apparatus candidate.

Specifically, on the basis of the apparatus information 400 regarding the first client apparatus 210 and the cooperation apparatus information 170 stored in the storage section 150, the cooperable apparatus determination section 120 extracts the second client apparatus candidate cooperable with the first client apparatus 210, among the plurality of client apparatuses connected to the server apparatus 100 via the network.

The cooperation apparatus information 170 represents cooperation history indicating whether each of the plurality of client apparatuses connected to the server apparatus 100 via the network has ever cooperated with the first client apparatus 210. Typically, the cooperation apparatus information 170 is information such as the number of incidents of cooperation with the first client apparatus 210, last cooperation time with the first client apparatus 210, and the display resolution of the display screen (display region) of each client apparatus.

FIG. 6 is a diagram showing cooperation history 600 representing contents of cooperation between the first client apparatus and the second client apparatus. In FIG. 6, there is history (No. 1) of cooperation between, for example, the first client apparatus "Justice" and the second client apparatus "Freedom", and the content of cooperation of which is "Navi". In the cooperation history (No. 1), the number of incidents of cooperation which is "3", display resolution which is "1920×1080", and last cooperation time which is "2009/3/31 13:30" are further stored. It should be noted that the more the number of incidents of cooperation is and, closer the last cooperation time to a current time is, the cooperation is considered to have a high degree of confidence in cooperation. Also, the display resolution is a display resolution of the second client apparatus in cooperation with the first client apparatus.

There is also history (No. 5) of cooperation between the first client apparatus "Justice" and the second client apparatus "Wing", which indicates failure in the cooperation. This is that, for example, if the first client apparatus "Justice" is assumed to have the apparatus information 400 regarding the first client apparatus 210 shown in FIG. 4, and the second client apparatus "Wing" has the following conditions, the cooperation therebetween is considered to be impossible.

Which is a case where a format of an image displayable in the second client apparatus "Wing" is, for example, MPEG (Moving Picture Experts Group), namely, a case where "mpg" is described in the <image> tag. Alternatively, which is a case where, for example, the display resolution of the second client apparatus "Wing" is "160×120" which is smaller than the display resolution of the first client apparatus, namely, a case where "160, 120" is described in the <resolution> tag. Alternatively, which is a case where "Navi" and "Record" are not included in the user interface (application) cooperable in the second client apparatus "Wing", namely, a case where "Navi" and "Record" are not described in the <cooperation> tag.

In this manner, every time the first client apparatus and the second client apparatus are caused to cooperate with each other, the cooperation information such as the number of incidents of cooperation and the last cooperation time are stored, and incooperable information indicative of incooperability is further stored. This allows the cooperable apparatus determination section 120 to efficiently and accurately extract the second client apparatus candidate cooperable with the first client apparatus 210, among the plurality of client apparatuses connected to the server apparatus 100 via the network.

Furthermore, in a case where there is a plurality of second client apparatus candidates cooperable with the first client apparatus 210, the cooperable apparatus determination section 120 may set priorities. Specifically, the cooperable apparatus determination section 120 may, for example, refer to the cooperation history 600 to set priorities for the second client apparatus candidates cooperable with the first client apparatus in descending order of the number of incidents of cooperation, in order starting from the most recent cooperation time, or in order starting from the largest display resolution, or set the priorities based on the combination of the number of incidents of cooperation, the last cooperation time, and the display resolution.

Also, in the case where there is a plurality of the second client apparatus candidates cooperable with the first client apparatus 210, the cooperable apparatus determination section 120 may select a second client apparatus candidate from the plurality of cooperable second client apparatus candidates. Specifically, the cooperable apparatus determination section 120 may, for example, refer to the cooperation history 600 to preferentially select, as the second client apparatus candidate, a second client apparatus that has the largest number of incidents of cooperation, among the second client apparatuses cooperable with the first client apparatus. Alternatively, the second client apparatus having the most recent cooperation time may be preferentially selected as the second client apparatus candidate, or the second client apparatus having the largest display resolution may be preferentially selected as the second client apparatus candidate. Furthermore, the second client apparatus candidate to be preferentially selected may be determined based on the combination of the number of incidents of cooperation, the last cooperation time, and the display resolution.

The user interface transmission control section 130 acquires a user interface of the first client apparatus 210 and a user interface of the second client apparatus candidate determined by the cooperable apparatus determination section 120, among the plurality of user interfaces 160 stored in the storage section 150. Here, the second client apparatus candidate determined by the cooperable apparatus determination section 120 is assumed to be the second client apparatus 220. That is, the user interface transmission control section 130 acquires the first user interface whereby the server apparatus 100 is operated in the first client apparatus 210, and the second user interface whereby the server apparatus 100 is operated in the second client apparatus 220.

Typically, the storage section 150 has stored therein a user interface correspondence table in which the apparatus information regarding the client apparatus and the user interface stored in the storage section 150 are associated with each other. The user interface transmission control section 130 refers to the user interface correspondence table to acquire the first user interface and the second user interface.

FIG. 7 is a diagram showing a user interface correspondence table 700. In FIG. 7, the user interfaces each corresponding to the client apparatus and the application are described. For example, it is described, with respect to the client apparatus "Justice", that a user interface applied to the application "Navi" is "J_Navi_UI" (No. 1). In addition, it is described, with respect to the client apparatus "Freedom", that a user interface applied to the application "Navi" is "F_Navi_UI" (No. 6).

Here, in order to attempt to cause the first client apparatus 210 "Justice" and the second client apparatus 220 "Freedom" to cooperate with each other by having "Navi" as the content of cooperation, the user interface transmission control section 130 refers to the user interface correspondence table 700 to acquire "J_Navi_UI" and "F_Navi_UI" among the plurality of user interfaces 160 stored in the storage section 150.

The transmission section 140 transmits to the first client apparatus 210 the first user interface acquired by the user interface transmission control section 130, and transmits to the second client apparatus 220 the second user interface acquired by the user interface transmission control section 130. Furthermore, the transmission section 140 simultaneously transmits a launch instruction to the second client apparatus 220 to launch the second user interface in the second client apparatus 220. By receiving the launch instruction from the server apparatus 100, the second client apparatus 220 launches the received second user interface in the background without displaying the received second user interface on the display screen (display region).

Furthermore, when the reception section 110 has received the cooperation request from the first client apparatus 210, the transmission section 140 transmits the display instruction to the second client apparatus 220. Here, the display instruction is an instruction to display the second user interface transmitted to the second client apparatus 220 on the second client apparatus 220.

It should be noted that, in a case where the cooperable apparatus determination section 120 has extracted the plurality of second client apparatus candidates, the user interface transmission control section 130 may acquire the user interfaces of the plurality of second client apparatus candidates among the plurality of user interfaces 160 stored in the storage section 150. In this case, the transmission section 140 transmits the acquired user interfaces of the plurality of second client apparatus candidates to the corresponding plurality of second client apparatus candidates. Furthermore, when the reception section 110 has received the cooperation request from the first client apparatus 210, the transmission section 140 transmits the display instruction to a second client apparatus candidate that is a cooperation target among the plurality of second client apparatus candidates.

It should be noted that the user may be allowed to select the second client apparatus candidate that is the cooperation target, or the server apparatus 100 may select the second client apparatus candidate, based on the priorities. In the case where the user is allowed for the selection, a second client apparatus candidate list may be transmitted from the server apparatus 100 to the first client apparatus 210, the first client apparatus 210 may allow the user to select a second client apparatus candidate from the second client apparatus candidate list, and transmit the cooperation request, which includes the selection result, to the server apparatus 100.

Furthermore, preferably, the user interface, which is running in the background in the second client apparatus candidate that is not the cooperation target, among the plurality of second client apparatus candidates, is terminated. The transmission section 140 may transmit a termination instruction to the second client apparatus candidate that is not the cooperation target, among the plurality of second client apparatus candidates, to terminate the user interface running in the background. Also, each second client apparatus candidate that has not received the display instruction within a predetermined period after launching the user interface in the background may be determined not to be the cooperation target, and may be caused to terminate the user interface running in the background. This allows reduction in use of unnecessary resources.

<Operation>

Last, a flow of process executed by the user interface display control system which controls the user interface display in the embodiment of the present invention will be described.

Figure 8:
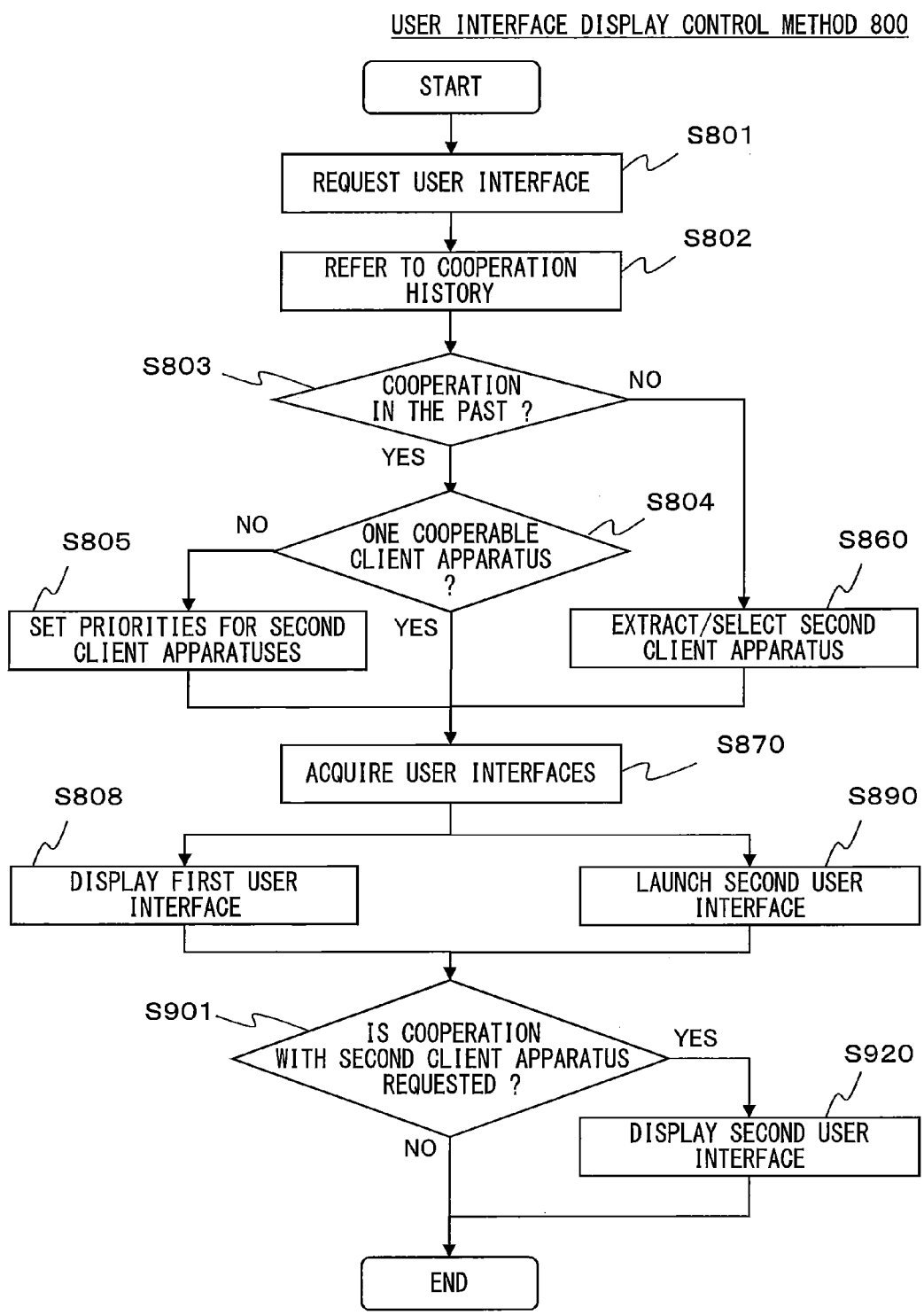
FIG. 8 is a diagram showing a user interface display control method 800 for controlling the user interface display.

FIG. 8 is a diagram showing a user interface display control method 800 which controls the user interface display. In FIG. 8, the user interface display control method 800 includes a user interface request step S801, a cooperation history reference step S802, a cooperation history determination step S803, a cooperable client apparatus determination step S804, a second client apparatus priority setting step S805, a second client apparatus extraction/selection step S860, a user interface acquisition step S870, a first user interface display step S808, a second user interface launch step S890, a second client apparatus cooperation request step S901, and a second user interface display step S920. It should be noted that it is assumed that the user interface display control method 800 is performed by the server apparatus 100, the first client apparatuses 210 and 230, and the second client apparatuses 220 and 240 in the home network system 10 shown in FIG. 1. Furthermore, the server apparatus 100 includes the configuration shown in FIG. 3.

In the user interface request step S801, the first client apparatus 210 transmits the user interface request to the server apparatus 100. The reception section 110 of the server apparatus 100 then receives the user interface request from the first client apparatus 210. Here, it is assumed that the user interface request includes the apparatus information regarding the first client apparatus 210. Specifically, the apparatus information regarding the first client apparatus 210 is the apparatus information 400 shown in FIG. 4.

In the cooperation history reference step S802, the cooperable apparatus determination section 120 of the server apparatus 100 refers to cooperation history stored in the storage section 150. Specifically, the cooperation history is the cooperation history 600 shown in FIG. 6.

In the cooperation history determination step S803, the cooperable apparatus determination section 120 of the server apparatus 100 determines, based on the apparatus information regarding the first client apparatus 210, whether there is a second client apparatus that has, in the past, cooperated with the first client apparatus 210. In a case where there is the second client apparatus that has, in the past, cooperated with the first client apparatus 210, the process proceeds to the cooperable client apparatus determination step S804. For example, when reference is made to the cooperation history 600 shown in FIG. 6 and if the first client apparatus 210 is "Justice" or "Peace" and the requested user interface is "Navi", it is determined that there is the second client apparatus that has, in the past, made the cooperation (Yes in the cooperation history determination step S803).

On the other hand, in a case where there is no second client apparatus that have, in the past, cooperated with the first client apparatus 210, the process proceeds to the second client apparatus extraction/selection step S860. For example, when reference is made to the cooperation history 600 shown in FIG. 6 and if the first client apparatus 210 is "XXXX", it is determined that there is no second client apparatus that have, in the past, cooperated with the first client apparatus 210 (No in the cooperation history determination step S803).

In the cooperable client apparatus determination step S804, the cooperable apparatus determination section 120 of the server apparatus 100 determines, based on the apparatus information regarding the first client apparatus 210 and the cooperation history, whether there is the second client apparatus that has, in the past, cooperated with the first client apparatus 210, and there is one cooperable second client apparatus candidate. In a case where there is one cooperable second client apparatus candidate, the process proceeds to the user interface acquisition step S870. For example, reference is made to the cooperation history 600 shown in FIG. 6, and in a case where the first client apparatus 210 is "Peace" and the requested user interface is "Navi", it is determined that there is one cooperable second client apparatus candidate which is "Freedom" (Yes in the cooperable client apparatus determination step S804).

On the other hand, in a case where the number of the cooperable second client apparatus candidates is not one, the process proceeds to the second client apparatus priority setting step S805. For example, reference is made to the cooperation history 600 shown in FIG. 6, and in a case where the first client apparatus 210 is "Justice" and the requested user interface is "Navi", it is determined that there are two cooperable second client apparatus candidates which are "Freedom" and "Strike" (No in the cooperable client apparatus determination step S804).

It should be noted that, in the second client apparatus priority setting step S805, the cooperable apparatus determination section 120 of the server apparatus 100 sets priorities for the plurality of cooperable second client apparatus candidates. In a case where the priorities are set here in descending order of the number of incidents of cooperation, the priorities are set so as to be in order of "Freedom" and then "Strike", and in a case where the priorities are set in order starting from the most recent cooperation time, the priorities are set so as to be in order of "Strike" and then "Freedom".

It should be noted that, in the second client apparatus priority setting step S805, the cooperable apparatus determination section 120 of the server apparatus 100 may select one second client apparatus candidate from among the plurality of cooperable second client apparatus candidates. In a case where the second client apparatus having the largest number of incidents of cooperation is to be preferentially selected, "Freedom" is selected, and in a case where the client apparatus having the most recent cooperation time is to be preferentially selected, "Strike" is selected.

In the second client apparatus extraction/selection step S860, the cooperable apparatus determination section 120 of the server apparatus 100 selects the second client apparatus candidate cooperable with the first client apparatus 210, that is the second client apparatus that has, in the past, not cooperated with the first client apparatus 210, among the client apparatuses connected to the server apparatus 100 via the network.

Figure 9:
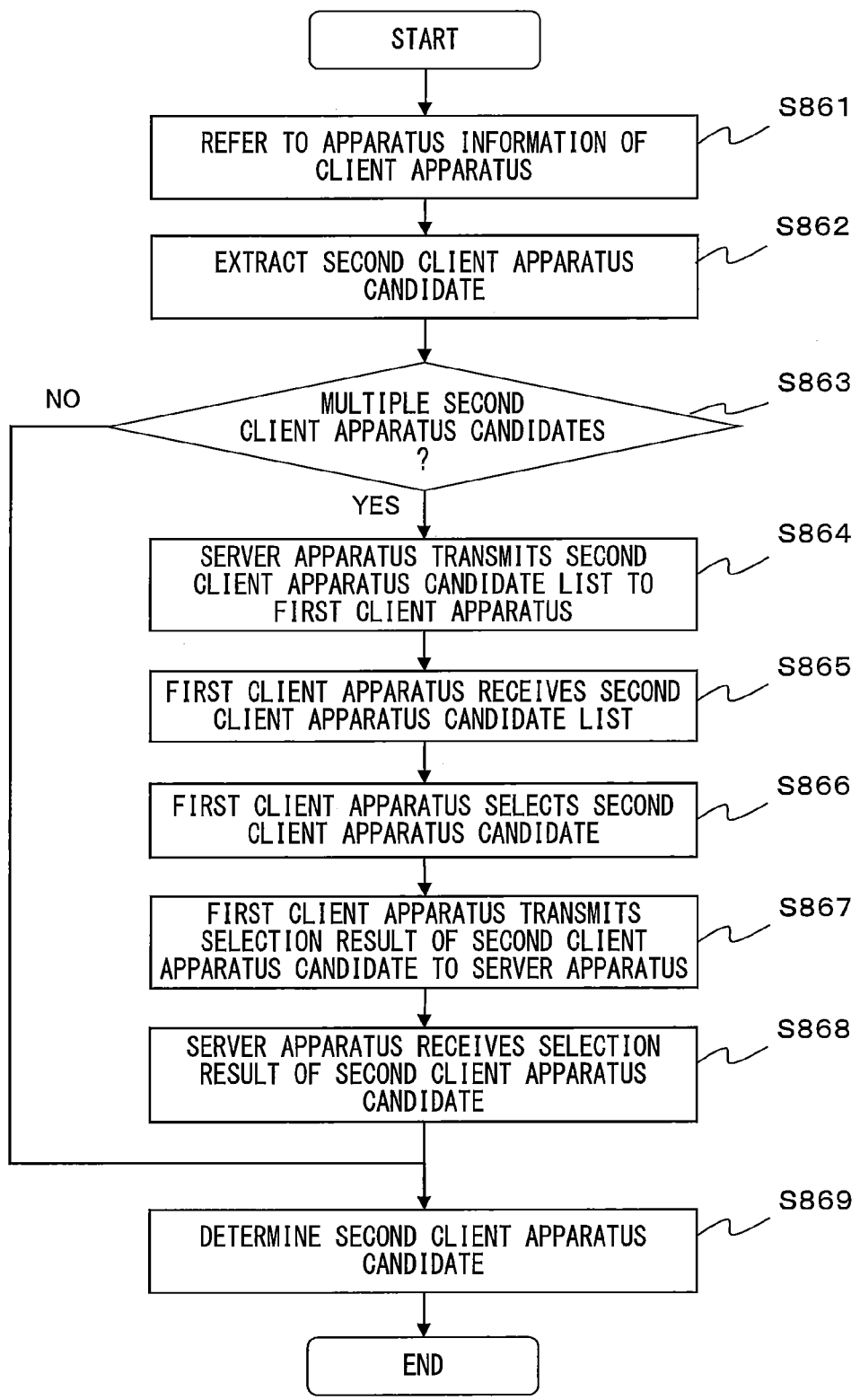
FIG. 9 is a diagram showing details of a second client apparatus extraction/selection step S860.

FIG. 9 is a diagram showing details of the second client apparatus extraction/selection step S860. In FIG. 9, the second client apparatus extraction/selection step S860 includes an apparatus information reference step S861, a second client apparatus candidate extraction step S862, a second client apparatus candidate determination step S863, a second client apparatus candidate list transmission step S864, a second client apparatus candidate list reception step S865, a second client apparatus candidate selection step S866, a second client apparatus candidate selection result transmission step S867, a second client apparatus candidate selection result reception step S868, and a second client apparatus candidate determination step S869.

In the apparatus information reference step S861, the cooperable apparatus determination section 120 refers to the apparatus information regarding the client apparatus connected to the server apparatus 100. The apparatus information regarding the client apparatus is the apparatus information regarding the first client apparatus shown in FIG. 4 and the apparatus information regarding the second client apparatus shown in FIG. 5.

In the second client apparatus candidate extraction step S862, the cooperable apparatus determination section 120 extracts the second client apparatus candidate cooperable with the first client apparatus 210, based on the apparatus information regarding the client apparatus. Specifically, first, it is determined, from the <operation> tag, whether the client apparatus can be the second client apparatus. It is then determined, from the <resolution> tag, whether the display resolution of the client apparatus is larger than the display resolution of the first client apparatus 210. Last, it is determined, from the <image> tag and <cooperation> tag, whether the client apparatus is cooperable with the first client apparatus 210, and the second client apparatus candidate is extracted.

In the second client apparatus candidate determination step S863, the cooperable apparatus determination section 120 determines whether there is a plurality of second client apparatus candidates extracted in the second client apparatus candidate extraction step S862. In a case where there is a plurality of second client apparatus candidates, the process proceeds to the second client apparatus candidate list transmission step S864 (Yes in the second client apparatus candidate determination step S863). On the other hand, in a case where the number of second client apparatus candidates is not plural, the process proceeds to the second client apparatus candidate determination step S869 (No in the second client apparatus candidate determination step S863).

In the second client apparatus candidate list transmission step S864, the transmission section 140 transmits to the first client apparatus 210 the second client apparatus candidate list indicative of the plurality of second client apparatus candidates extracted in the second client apparatus candidate extraction step S862.

In the second client apparatus candidate list reception step S865, the first client apparatus 210 receives the second client apparatus candidate list from the server apparatus 100.

In the second client apparatus candidate selection step S866, the first client apparatus 210 selects one second client apparatus candidate among the plurality of second client apparatus candidates, based on the second client apparatus candidate list. Typically, the first client apparatus 210 displays the second client apparatus candidate list on the screen, and allows the user to select one second client apparatus candidate.

In the second client apparatus candidate selection result transmission step S867, the first client apparatus 210 transmits to the server apparatus 100 a selection result of the second client apparatus candidate selected in the second client apparatus candidate selection step S866.

In the second client apparatus candidate selection result reception step S868, the reception section 110 receives the selection result of the second client apparatus candidate from the first client apparatus 210.

In the second client apparatus candidate determination step S869, the cooperable apparatus determination section 120 determines the one second client apparatus candidate selected in the first client apparatus 210 or the second client apparatus candidate extracted in the second client apparatus candidate extraction step S862, as the second client apparatus candidate.

It should be noted that while, here, in a case where there is a plurality of second client apparatus candidates the user is allowed to select one second client apparatus candidate, one second client apparatus candidate may be selected in the server apparatus 100 without asking the user for the selection. For example, the cooperable apparatus determination section 120 may refer to the apparatus information to select the second client apparatus candidate having the largest display resolution.

Furthermore, in a case where there is a plurality of second client apparatus candidates, one second client apparatus candidate may not be determined, but the plurality of second client apparatus candidates may be determined, as the second client apparatus candidates. In this case, the priorities may be set for the plurality of second client apparatus candidates in descending order starting from the largest display resolution, as described in the second client apparatus priority setting step S805, for example.

On the other hand, in a case where there is no second client apparatus candidate, there is no second client apparatus cooperable with the first client apparatus 210. Thus, the user uses the operation screen for the server apparatus 100 displayed on the display screen (display region) of the first client apparatus 210 to operate the server apparatus 100.

In the user interface acquisition step S870, the user interface transmission control section 130 of the server apparatus 100 acquires user interfaces of the first client apparatus 210 and the second client apparatus candidate cooperable with the first client apparatus 210.

Figure 10:
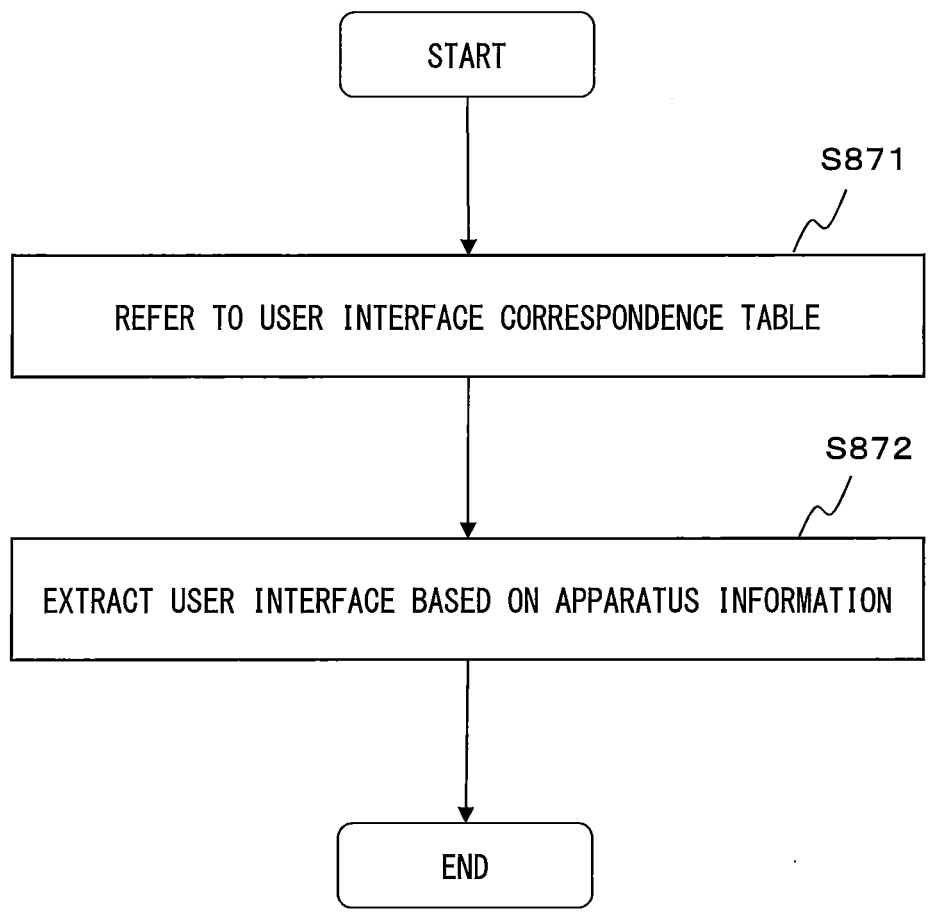
FIG. 10 is a diagram showing details of a user interface acquisition step S870.

FIG. 10 is a diagram showing details of the user interface acquisition step S870. In FIG. 10, the user interface acquisition step S870 includes a user interface correspondence table reference step S871 and a user interface extraction step S872.

In the user interface correspondence table reference step S871, the user interface transmission control section 130 refers to the user interface correspondence table 700, shown in FIG. 7, which is stored in the storage section 150.

In the user interface extraction step S872, the user interface transmission control section 130 extracts a user interface of the first client apparatus 210 and a user interface of the second client apparatus candidate among the plurality of user interfaces 160 stored in the storage section 150. Specifically, in a case where the content of cooperation is "Navi", the first client apparatus 210 is "Justice" and the second client apparatus candidate is "Freedom", the user interface transmission control section 130 refers to the user interface correspondence table 700 shown in FIG. 7 to extract "J_Navi_UI" and "F_Navi_UI".

Then, the user interface of the first client apparatus 210 and the user interface of the second client apparatus candidate which are acquired in the user interface acquisition step S870 are determined to be the first user interface and the second user interface, respectively.

In the first user interface display step S808, the transmission section 140 of the server apparatus 100 transmits the first user interface to the first client apparatus 210. The first client apparatus 210 then receives the first user interface from the server apparatus 100 and displays the first user interface on the display screen (display region) of the first client apparatus 210.

In the second user interface launch step S890, the second client apparatus candidate launches the second user interface in the background of the second client apparatus candidate.

Figure 11:
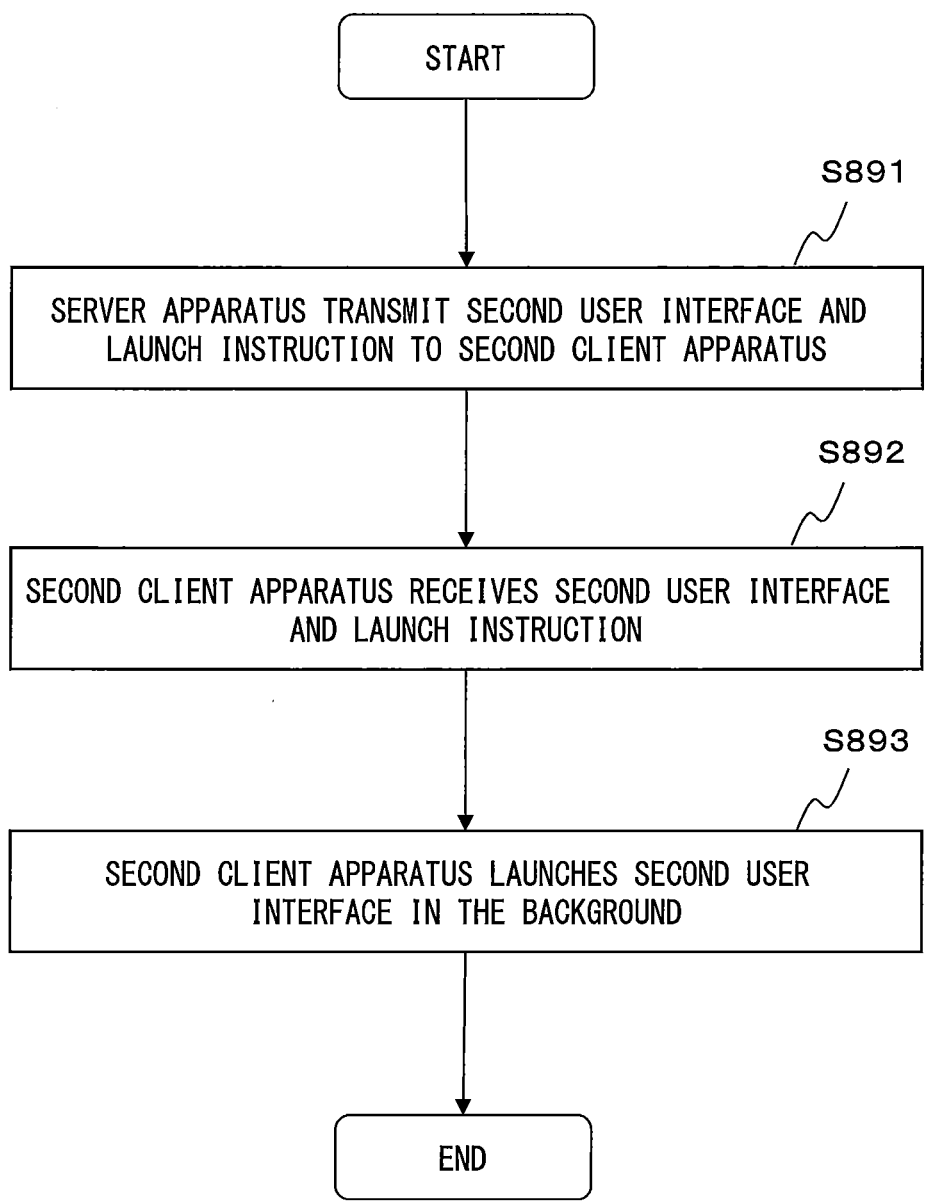
FIG. 11 is a diagram showing details of a second user interface launch step S890.

FIG. 11 is a diagram showing details of the second user interface launch step S890. In FIG. 11, the second user interface launch step S890 includes a second user interface launch instruction transmission step S891, a second user interface launch instruction reception step S892, and a second user interface launch performing step S893.

In the second user interface launch instruction transmission step S891, the transmission section 140 of the server apparatus 100 transmits the second user interface to the second client apparatus candidate. Simultaneously, the transmission section 140 of the server apparatus 100 transmits a launch instruction to the second client apparatus candidate to launch the second user interface in the second client apparatus candidate.

In the second user interface launch instruction reception step S892, the second client apparatus candidate receives the second user interface and the launch instruction from the server apparatus 100.

In the second user interface launch performing step S893, the second client apparatus candidate launches the second user interface in the background without displaying the second user interface on the display screen (display region) of the second client apparatus candidate.

In the second client apparatus cooperation request step S901, the reception section 110 of the server apparatus 100 determines whether the reception section 110 has received the cooperation request from the first client apparatus 210. Here, the cooperation request is a request for displaying the second user interface on the display screen (display region) of the second client apparatus candidate. In a case where there is no cooperation request from the first client apparatus 210, the user uses the first client apparatus 210 to operate the server apparatus 100 while referring to the first user interface displayed on the display screen (display region) of the first client apparatus 210 (No in the second client apparatus cooperation request step S901). On the other hand, in a case where there is the cooperation request from the first client apparatus 210, the process proceeds to the second user interface display step S920 (Yes in the second client apparatus cooperation request step S901).

In the second user interface display step S920, the second client apparatus candidate displays the second user interface on the display screen (display region) of the second client apparatus candidate.

Figure 12:
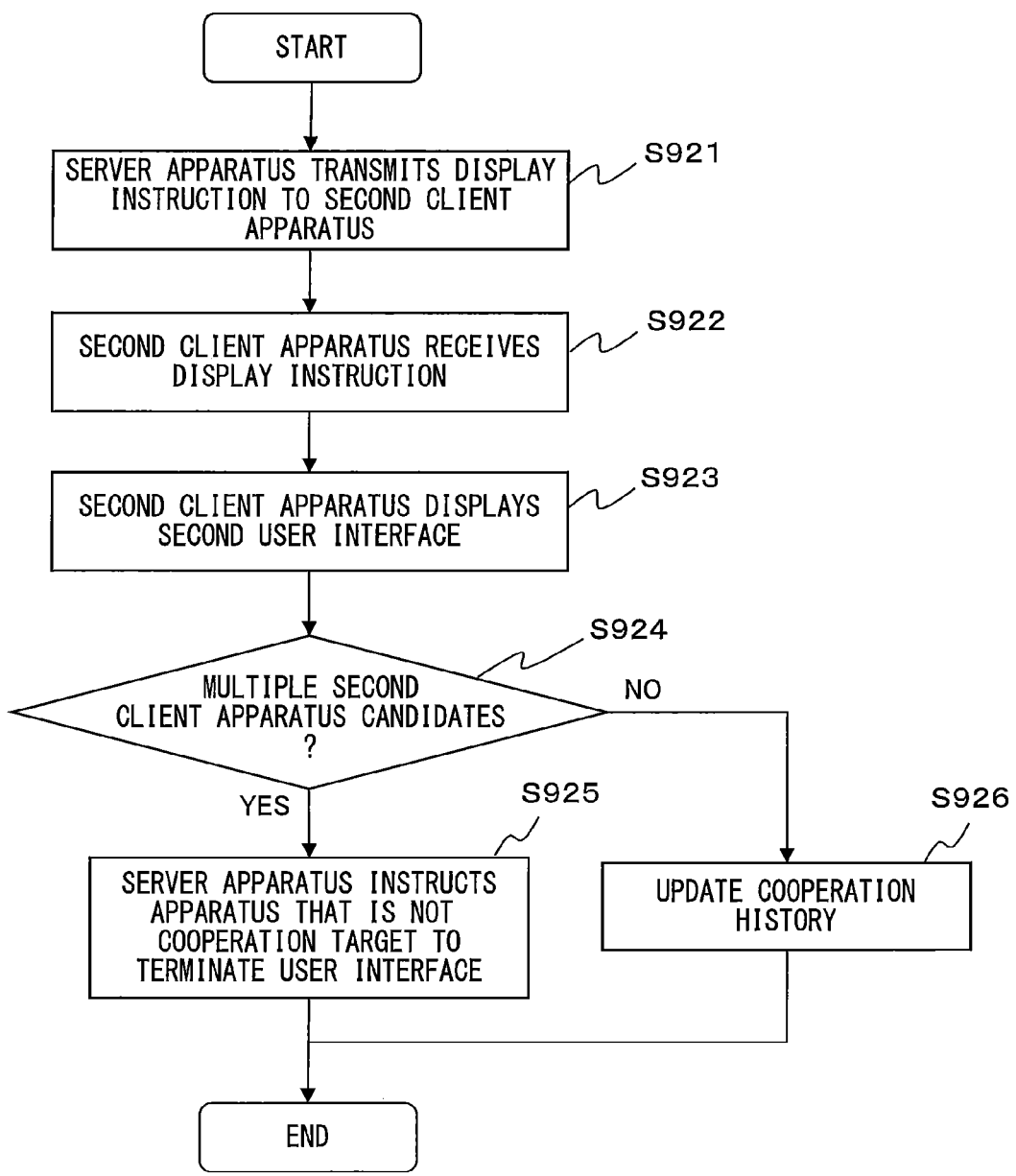
FIG. 12 is a diagram showing details of a second user interface display step S920.

FIG. 12 is a diagram showing details of the second user interface display step S920. In FIG. 12, the second user interface display step S920 includes a second user interface display instruction transmission step S921, a second user interface display instruction reception step S922, a second user interface display performing step S923, a second client apparatus candidate identification step S924, a second user interface termination instruction step S925, and a cooperation history update step S926.

In the second user interface display instruction transmission step S921, on the basis of the cooperation request from the first client apparatus 210 in the second client apparatus cooperation request step S901, the transmission section 140 of the server apparatus 100 transmits a display instruction to the second client apparatus candidate to display the second user interface on the display screen (display region) of the second client apparatus candidate.

In the second user interface display instruction reception step S922, the second client apparatus candidate receives the second user interface and the display instruction from the server apparatus 100.

In the second user interface display performing step S923, the second client apparatus candidate displays the second user interface, which has been maintained running in the background, on the display screen (display region) of the second client apparatus candidate.

In the second client apparatus candidate identification step S924, the server apparatus 100 identifies whether the second user interface and the launch instruction has been transmitted to the plurality of second client apparatus candidates. In a case where the second user interface and the launch instruction have been transmitted to the plurality of second client apparatus candidates, the process proceeds to the second user interface termination instruction step S925 (Yes in the second client apparatus candidate identification step S924). In a case where the second user interface and the launch instruction has been transmitted to one second client apparatus candidate, the process proceeds to the cooperation history update step S926 (No in the second client apparatus candidate identification step S924).

In the second user interface termination instruction step S925, the transmission section 140 of the server apparatus 100 transmits a termination instruction to the second client apparatus candidate that is not the cooperation target, among the plurality of second client apparatus candidates, to terminate the second user interface running in the background. Here, the second client apparatus candidate that is the cooperation target among the plurality of second client apparatus candidates is determined based on the cooperation request in the second client apparatus cooperation request step S901. Specifically, the second client apparatus that cooperates with the first client apparatus 210 is selected based on the cooperation request from the first client apparatus 210.

In other words, the display instruction in the second user interface display instruction transmission step S921 is transmitted to only the second client apparatus candidate that is the cooperation target among the plurality of second client apparatus candidates, and the second client apparatus candidate that is the cooperation target executes the aforementioned second user interface display instruction reception step S922 and second user interface display performing step S923.

Therefore, the second client apparatus candidate that is not the cooperation target among the plurality of second client apparatus candidates receives the termination instruction from the server apparatus 100, and terminates the second user interface which has been maintained running in the background. This allows reduction in use of unnecessary resources.

In the cooperation history update step S926, the server apparatus 100 stores, in the cooperation history, information related to the cooperation between the first client apparatus 210 and the second client apparatus which has cooperated with the first client apparatus 210. Specifically, the cooperation history 600 shown in FIG. 6, such as the first client apparatus, the second client apparatus, the content of cooperation, and the like are updated.

It should be noted that while only the second client apparatus candidate that cooperates with the first client apparatus 210 among the plurality of second client apparatus candidates is stored in the cooperation history here, the second client apparatus candidate that is not the cooperation target among the plurality of second client apparatus candidates may also be stored in the cooperation history. Even in the case where the number of incidents of cooperation is "0", if the apparatus is stored as cooperable second client apparatus, the second client apparatus candidate can be efficiently and accurately extracted next time.

As described above, according to the server apparatus 100 in the embodiment of the present invention, on the basis of the user interface request from the first client apparatus 210, the second client apparatus candidate cooperable with the first client apparatus is extracted and the instruction is transmitted to the second client apparatus candidate to launch the second user interface. This allows the second client apparatus candidate, when there is the cooperation request from the first client apparatus 210, to instantly display the second user interface, that is already running, on the display screen (display region). That is, the first client apparatus 210 and the second client apparatus cooperate with each other to allow the operation of the server apparatus 100 in a short time after the cooperation request from the first client apparatus 210 (the user).

In addition, since the display screen (display region) of the second client apparatus is larger than the display screen (display region) of the first client apparatus 210, the user viewability improves.

In addition, since the first client apparatus 210 is used to operate the user interface displayed on the display screen (display region) of the second client apparatus, a client apparatus having high operability, such as a touch pad or touch panel, can be chosen. This allows reduction in user input error and also leads to the improvement in operability.

Figure 13:
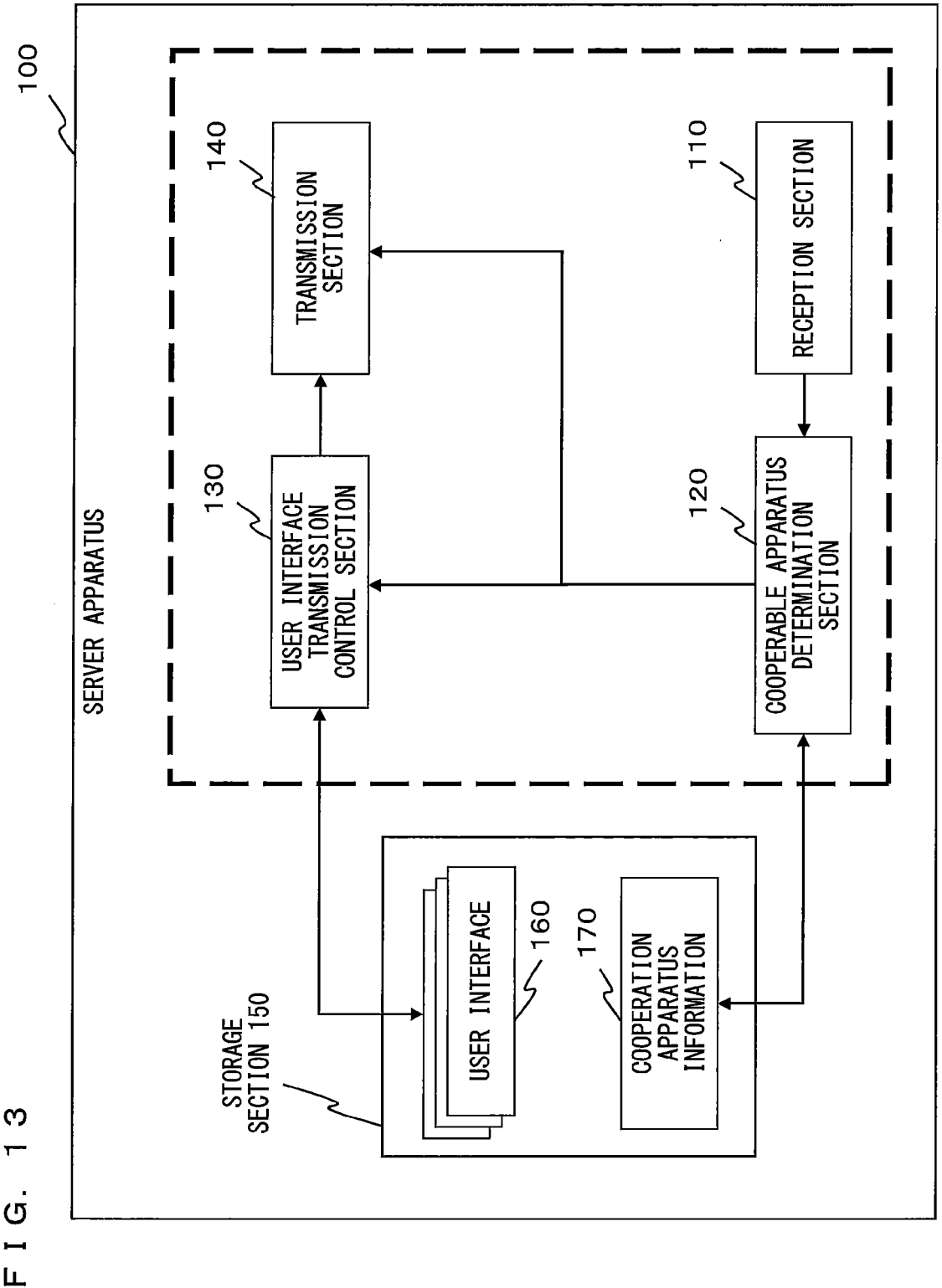
FIG. 13 is a diagram showing components, that are implemented into an integrated circuit, of the server apparatus 100 in the embodiment of the present invention shown in FIG. 3.
Figure 14:
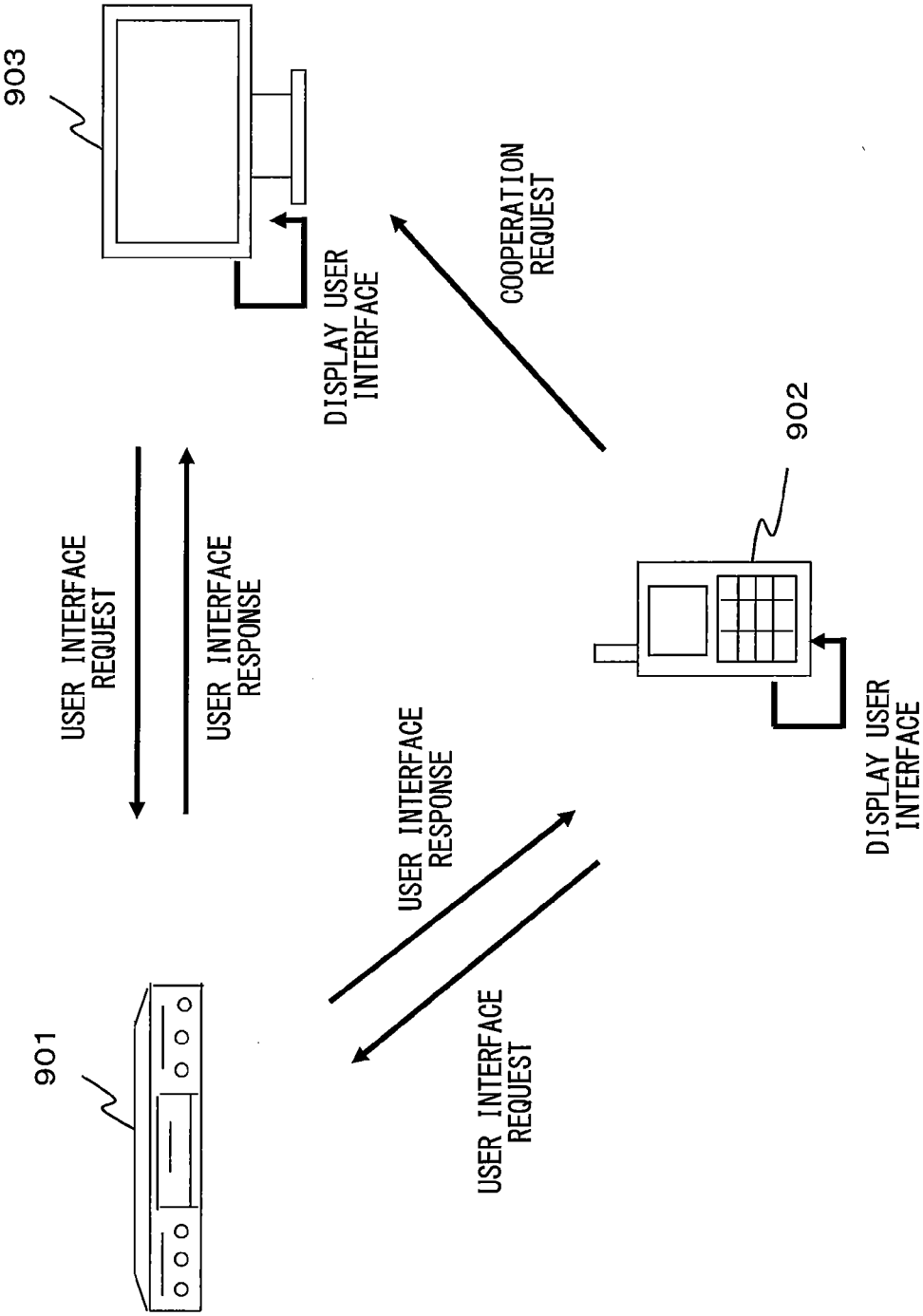
FIG. 14 is a diagram showing a user interface display control system 90 which controls a user interface display in a conventional technology.

It should be noted that the aforementioned server apparatus 100 in the embodiment of the present invention may be realized as an LSI (Large Scale Integration), which is an integrated circuit. FIG. 13 is a diagram showing components, that are implemented into an integrated circuit, of the server apparatus 100 in the embodiment of the present invention shown in FIG. 3. In FIG. 13, the reception section 110, the cooperable apparatus determination section 120, the user interface transmission control section 130, and the transmission section 140 are implemented into the integrated circuit (area enclosed with a dotted line). These components may be formed into one chip, or a part or the whole of the components may be formed into one chip. Here, while the integrated circuit is referred to as the LSI, the integrated circuit may also be referred to as an IC (Integrated Circuit), a system LSI, a super LSI, or an ultra LSI, depending on the difference in the degree of integration. Furthermore, the method for circuit integration is not limited to the LSI, and may be realized through circuit-integration of a dedicated circuit or a general-purpose processor. An FPGA (Field Programmable Gate Array) that is programmable after manufacturing the LSI or a reconfigurable processor that is reconfigurable with respect to the connections and configurations of a circuit cell within the LSI may be used. Alternatively, arithmetic processing of these function blocks may be performed using, for example, a DSP, a CPU (Central Processing Unit), and the like. Furthermore, process steps of these may also be stored as a program on a storage medium and processed by executing the program.

Further, if a circuit integration technology replacing the LSI technology is developed with an advance of semiconductor technology and other technologies deviated therefrom, it is needless to say that the integration of the functional blocks may be performed by using the technology. Application of biotechnology or the like may be possible.

INDUSTRIAL APPLICABILITY

The present invention is useful for digital devices in connection via a network, and particularly for cases where digital devices are caused to cooperate with each other to provide services.

DESCRIPTION OF THE REFERENCE CHARACTERS 10 home network system
20, 90 user interface display control system
100, 901 server apparatus (DVD recorder)
110 reception section
120 cooperable apparatus determination section
130 user interface transmission control section
140 transmission section
150 storage section
160 user interfaces
170 cooperation apparatus information
210, 220, 230, 240, 902, 903 client apparatus (mobile phone, digital TV)
400, 500 apparatus information
600 cooperation history
700 user interface correspondence table
800 user interface display control method
S801 user interface request step
S802 cooperation history reference step
S803 cooperation history determination step
S804 cooperable client apparatus determination step S805 second client apparatus priority setting step
S860 second client apparatus extraction/selection step
S861 apparatus information reference step
S862 second client apparatus candidate extraction step
S863 second client apparatus candidate determination step
S864 second client apparatus candidate list transmission step
S865 second client apparatus candidate list reception step
S866 second client apparatus candidate selection step
S867 second client apparatus candidate selection result transmission step
S868 second client apparatus candidate selection result reception step
S869 second client apparatus candidate determination step
S870 user interface acquisition step
S871 user interface correspondence table reference step
S872 user interface extraction step
S808 first user interface display step
S890 second user interface launch step
S891 second user interface launch instruction transmission step
S892 second user interface launch instruction reception step
S893 second user interface launch performing step
S901 second client apparatus cooperation request step
S920 second user interface display step
S921 second user interface display instruction transmission step
S922 second user interface display instruction reception step
S923 second user interface display performing step
S924 second client apparatus candidate identification step
S925 second user interface termination instruction step
S926 cooperation history update step

The invention claimed is:

1. A server apparatus for controlling user interface display in a first client apparatus and a second client apparatus different from the first client apparatus, which are any of a plurality of client apparatuses communicated with each other via a network, the server apparatus comprising:
a storage section having stored therein a user interface, for each of the plurality of client apparatuses, whereby the server apparatus is operated in the client apparatus;
a reception section for receiving, from the first client apparatus,
a user interface request which is a request for a first user interface, whereby the server apparatus is operated in the first client apparatus, and
a cooperation request for causing the first client apparatus and the second client apparatus to cooperate with each other for an operation of the server apparatus;
a cooperable apparatus determination section for selecting a second client apparatus cooperable with the first client apparatus among the plurality of client apparatuses, based on the user interface request received by the reception section;
a user interface transmission control section for acquiring a second user interface, whereby the server apparatus is operated in the second client apparatus selected by the cooperable apparatus determination section, among the user interfaces stored in the storage section; and
a transmission section for transmitting, to the second client apparatus, the second user interface acquired by the user interface transmission control section and a launch instruction to launch the second user interface, wherein
when the reception section has received the cooperation request from the first client apparatus, the transmission section transmits a display instruction to the second client apparatus to display the second user interface transmitted to the second client apparatus, based on the cooperation request received by the reception section.

2. The server apparatus according to claim 1, wherein, in a case where there is a plurality of second client apparatuses cooperable with the first client apparatus, the cooperable apparatus determination section sets priorities in selecting a cooperation target for the plurality of second client apparatuses.

3. The server apparatus according to claim 2, wherein
the storage section has stored therein cooperation history, regarding the plurality of client apparatuses, which indicates whether each of the plurality of client apparatuses has ever cooperated with the first client apparatus, and
the cooperable apparatus determination section refers to the cooperation history stored in the storage section to set the priorities.

4. The server apparatus according to claim 3, wherein
the cooperation history includes cooperation count information which is information regarding the number of incidents of cooperation between the first client apparatus and each of the plurality of client apparatuses, and
the cooperable apparatus determination section sets the priorities, based on the cooperation count information.

5. The server apparatus according to claim 3, wherein
the cooperation history includes cooperation time information which is information regarding time when the first client apparatus and each of the plurality of client apparatuses cooperate with each other, and
the cooperable apparatus determination section sets the priorities, based on the cooperation time information.

6. The server apparatus according to claim 2, wherein, in a case where there is a plurality of second client apparatuses cooperable with the first client apparatus, the transmission section transmits a termination instruction to a second client apparatus, that is not selected as the cooperation target, to terminate the user interface, which is running in background, in the second client apparatus that is not selected as the cooperation target.

7. The server apparatus according to claim 1, wherein
the storage section has stored therein cooperation history, regarding the plurality of client apparatuses, which indicates whether each of the plurality of client apparatuses has ever cooperated with the first client apparatus, and
the cooperable apparatus determination section refers to the cooperation history stored in the storage section to select a client apparatus that has ever cooperated with the first client apparatus, as the second client apparatus.

8. The server apparatus according to claim 7, wherein
the cooperation history includes cooperation count information which is information regarding the number of incidents of cooperation between the first client apparatus and each of the plurality of client apparatuses, and
the cooperable apparatus determination section determines confidence in cooperation as the second client apparatus, based on the cooperation count information.

9. The server apparatus according to claim 7, wherein
the cooperation history includes cooperation time information which is information regarding time when the first client apparatus and each of the plurality of client apparatuses cooperate with each other, and
the cooperable apparatus determination section determines confidence in cooperation as the second client apparatus, based on the cooperation time information.

10. The server apparatus according to claim 1, wherein the cooperable apparatus determination section selects a client apparatus having a display screen (display region) larger than a display screen (display region) of the first client apparatus, as the second client apparatus.

11. The server apparatus according to claim 1, wherein
the storage section has stored therein a user interface correspondence table in which apparatus information regarding each of the plurality of client apparatuses and the user interface stored in the storage section are associated with each other, and
the user interface transmission control section refers to the user interface correspondence table stored in the storage section to acquire the first user interface and the second user interface.

12. A user interface display control method executed by a server apparatus for controlling user interface display in a first client apparatus and a second client apparatus different from the first client apparatus, which are any of a plurality of client apparatuses communicated with each other via a network, the user interface display control method comprising:
   a user interface request reception step of receiving, from the first client apparatus, a user interface request which is a request for a first user interface, whereby the server apparatus is operated in the first client apparatus;
   a cooperable apparatus determination step of selecting a second client apparatus cooperable with the first client apparatus among the plurality of client apparatuses, based on the user interface request received in the user interface request reception step;
   a user interface transmission control step of acquiring a second user interface, whereby the server apparatus is operated in the second client apparatus selected in the cooperable apparatus determination step, among previously stored user interfaces, each of which is for each of the plurality of client apparatuses, whereby the server apparatus is operated in the client apparatus;
   a user interface transmission step of transmitting, to the second client apparatus, the second user interface acquired in the user interface transmission control step and a launch instruction to launch the second user interface;
   a cooperation request reception step of receiving a cooperation request for causing the first client apparatus and the second client apparatus to cooperate with each other for an operation of the server apparatus; and
   a second user interface display instruction transmission step of transmitting a display instruction to the second client apparatus to display the second user interface transmitted to the second client apparatus, based on the cooperation request received from the first client apparatus in the cooperation request reception step.

13. An integrated circuit used in a server apparatus for controlling user interface display in a first client apparatus and a second client apparatus different from the first client apparatus, which are any of a plurality of client apparatuses communicated with each other via a network, the integrated circuit comprising:
   a reception section for receiving, from the first client apparatus,
      a user interface request which is a request for a first user interface, whereby the server apparatus is operated in the first client apparatus, and
      a cooperation request for causing the first client apparatus and the second client apparatus to cooperate with each other for an operation of the server apparatus;
   a cooperable apparatus determination section for selecting a second client apparatus cooperable with the first client apparatus among the plurality of client apparatuses, based on the user interface request received by the reception section;
   a user interface transmission control section for acquiring a second user interface, whereby the server apparatus is operated in the second client apparatus selected by the cooperable apparatus determination section, among previously stored user interfaces, each of which is for each of the plurality of client apparatuses, whereby the server apparatus is operated in the client apparatus; and
   a transmission section for transmitting, to the second client apparatus, the second user interface acquired by the user interface transmission control section and a launch instruction to launch the second user interface, wherein
   when the reception section has received the cooperation request from the first client apparatus, the transmission section transmits a display instruction to the second client apparatus to display the second user interface transmitted to the second client apparatus, based on the cooperation request received by the reception section.

* * * * *